Oct. 7, 1947.    M. B. NELSON    2,428,499
PLANT TRANSPLANTER
Filed March 10, 1945
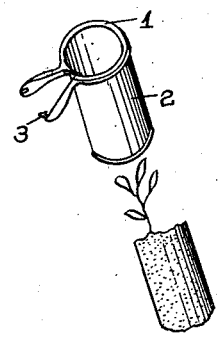
FIG. 1.
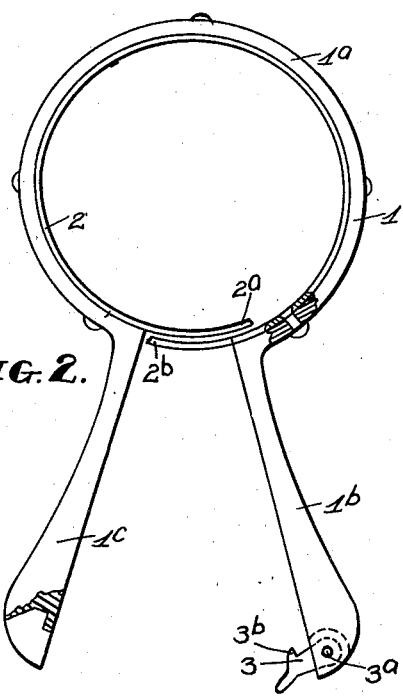
FIG. 2.
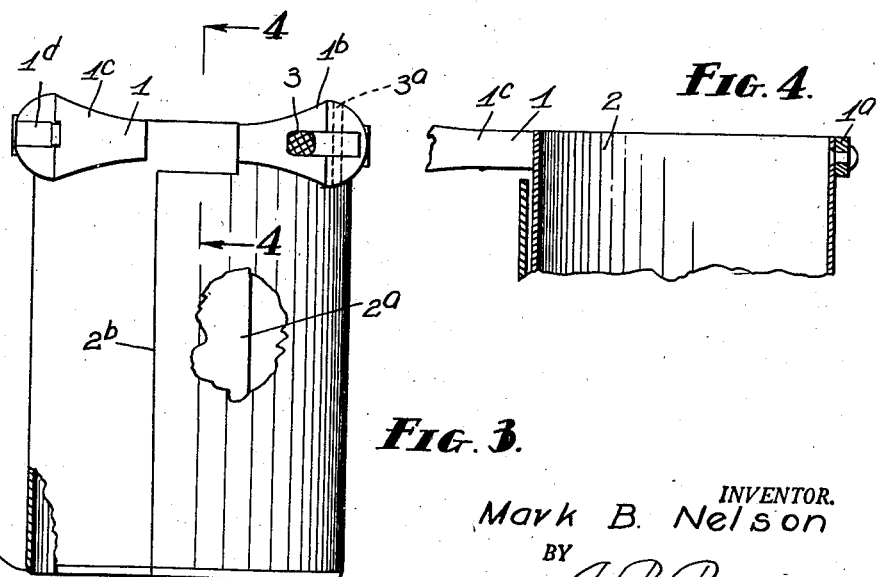
FIG. 4.
FIG. 3.
INVENTOR.
Mark B. Nelson
BY
A. B. Bowman
ATTORNEY

Patented Oct. 7, 1947

2,428,499

UNITED STATES PATENT OFFICE 2,428,499

PLANT TRANSPLANTER

Mark B. Nelson, San Diego, Calif.

Application March 10, 1945, Serial No. 581,996

1 Claim. (Cl. 47—37)

My invention relates to a plant transplanter, more particularly for use in removing various plants from the ground and placing them in a new position or location in the ground and the objects of my invention are:

First, to provide a plant transplanter which is particularly adapted for use in transferring young plants from one place to another without disturbing the growth or adversely affecting the plant during such operation.

Second, to provide a plant transplanter of this class which maintains the soil around the roots of the plant in bent compressed relation whereby the fine roots of the plant are not disturbed in relation with the plant roots adjacent said roots in the soil;

Third, to provide a plant transplanter of this class in which a latch means is provided in connection with the handles thereof for positively maintaining the soil around the plant roots in proper compressed density;

Fourth, to provide a plant transplanter of this class having a sharp peripheral edge arranged to make a clean cut outline of the plant roots in the soil whereby the plant roots are not disturbed by positioning the soil casing in surrounding relation with the plant root;

Fifth, to provide a plant transplanter of this class having a substantially cylindrical casing in which the opposite edges are overlapped relatively to each other providing a substantially spiral in cross section soil casing which is adapted to form a continuous casing around the plant root and is readily contracted to exert the proper pressure on the soil while holding it in normal contact with the flange root; and Sixth, to provide a plant transplanter of this class which is very simple and economical of construction, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claim, reference being had to the accompanying drawings and to the characters of reference thereon which form a part of this application in which:

Figure 1 is a perspective view of my soil transplanter showing a block of soil, together with a plant removed from the soil by my plant transplanter; Fig. 2 is an enlarged top or plan view of my plant transplanter showing the soil casing and handle members thereof in open position and further showing portions broken away and in section to amplify the illustration; Fig. 3 is a side view thereof showing portions broken away and in section to amplify the illustration; and Fig. 4 is a fragmentary sectional view taken from the line 4—4 of Fig. 3.

Similar characters of reference refer to similar parts and portions throughout the several views of the drawings:

The handle ring 1, soil casing member 2 and the handle latch 3 constitute the principal parts and portions of my plant transplanter.

The handle ring 1 is a band-like member having an arcuate portion 1a and extending diverging handles 1b and 1c. It will be noted that the arcuate portion 1a of the handle ring 1 is resilient and tends to force the handles 1b and 1c apart. Secured by riveting, or otherwise as desired, to the handle ring 1 is the soil casing 2. This soil casing 2 is preferably in the form of a circular in cross section cylinder having overlapping edges providing a substantially spiral in cross section cylinder wall. As shown in Fig. 2 of the drawings, the overlapping edges 2a and 2b slide relatively to each other when the handles 1b and 1c are forced together. The upper edge of the soil casing 2 is secured to the arcuate portion 1a of the handle ring 1 and the opposite end of the soil casing 2 is provided with a sharp edge portion 2c, as shown best in Fig. 3 of the drawings. This sharp edge 2c is arranged to define and cut the outline of the soil block in which the plant is positioned. The handle latch 3 is pivotally mounted on the pin 3a in connection with the extending end of the handle 1b. This handle latch 3 is provided with a tooth 3b adapted to engage the ledge 1d of the handle 1c, as shown best in Figs. 2 and 3 of the drawings.

The operation of my plant transplanter is substantially as follows:

Assuming that a certain plant must be moved from one position in the soil to a new location, the operator of my plant transplanter must proceed as follows: The soil casing 2 is taken in the normal open position, as shown in Fig. 2 of the drawings and the handles 1b and 1c are also in substantially the position as shown in Fig. 2 of the drawings when the soil casing 2 is placed over and around the plant. The sharp edge portion 2c is then forced downwardly cutting the soil around the roots of the plant until the handle ring 1 is near the surface of the soil. Then the operator forces the handles 1b and 1c together until the latch 3b is positioned over the ledge 1b of the handle 1c.

It will be noted that during the process of forcing the handles 1b and 1c together, the inside diameter of the soil casings 2 is reduced and the edge portions 2a and 2b slide away from each other in arcuate relationship, causing the soil around the root of the plant to be properly compressed and maintained in close engagement with said root, having the latch 3b in engagement with the ledge 1d whereby the handle latch 3 holds the handles 1b and 1c together. The soil casing 2 is lifted upwardly carrying with it the soil therein which contains the roots of the plant being removed from the soil. The soil casing 2 is then placed into a hole in the soil prepared to receive the block of soil about the plant roots. The handle ring 1 is positioned as near as practical to the upper surface of the soil at the new location. Then the surrounding soil is pressed inwardly against the outer side of the soil casing 2 and the handle latch 3 is disengaged permitting the handles 1b and 1c to be forced apart in order to enlarge the diameter of the soil casing 2 and remove the same from its position about the block of soil encasing the plant root.

Though I have shown and describd a particular construction, combination and arrangement of parts and portions, I do not wish to be limited to this particular construction, combination and arrangement but desire to include in the scope of my invention the construction, combination and arrangement substantially as set forth in the appended claim.

Having thus described my invention, what I claim as new and desire to secure by Letters Patent is:

In a plant transplanter of the class described, the combination of a hollow substantially cylindrical soil casing, spiral in cross section with overlapping edges at all times and a resilient handle ring secured around one end thereof and having diverging handle portions spaced some distance from the overlapping edges and extending substantially radially therefrom.

MARK B. NELSON.

REFERENCES CITED

The following references are of record in the file of this patent:

UNITED STATES PATENTS

| Number | Name | Date |
|---|---|---|
| 310,592 | Johnson | Jan. 13, 1885 |
| 1,383,112 | Hanson | June 28, 1921 |
| 1,326,858 | Glasscock | Dec. 30, 1919 |
| 1,110,220 | Millsap | Sept. 8, 1914 |